United States Patent

Hunt

[11] 4,068,160

[45] Jan. 10, 1978

[54] METHOD FOR DETECTING SUBSURFACE MINERAL BODIES USING GRAVITY MAGNETIC AND TOPOGRAPHIC SURVEYS

[75] Inventor: Hubert B. Hunt, Edmond, Okla.

[73] Assignee: Texas Pacific Oil Company, Inc., Dallas, Tex.

[21] Appl. No.: 682,410

[22] Filed: May 3, 1976

[51] Int. Cl.² .................. G01V 3/08; G01V 7/06; G01V 11/00

[52] U.S. Cl. ........................................ 324/1; 324/8

[58] Field of Search .................... 324/1, 8; 73/382

[56] References Cited

U.S. PATENT DOCUMENTS

| | | | |
|---|---|---|---|
| 2,586,667 | 2/1952 | Kunetz | 324/1 |
| 3,066,255 | 11/1962 | Westphal | 73/382 X |

*Primary Examiner*—Gerard R. Strecker
*Attorney, Agent, or Firm*—Dunlap, Codding & McCarthy

[57] ABSTRACT

A method for determining a set of surface locations lying along a predetermined line of survey beneath which there is a relatively high probability of existing subsurface mineral bodies exhibiting relatively high density and relatively low magnetic susceptibility by selecting for membership in said set those surface locations lying in regions where a local minimum of magnetic field intensity substantially correlates to a local maximum of gravitational field intensity, those surface locations lying within regions of local topographic irregularity wherein the gravitational field intensity substantially directly correlates with the surface elevation, and those surface locations lying within regions wherein a steep gradient between a local maximum and an adjacent local minimum of the magnetic field intensities substantially directly correlates to a steep gradient between a local maximum and an adjacent local minimum of the gravitational field intensities.

4 Claims, 1 Drawing Figure

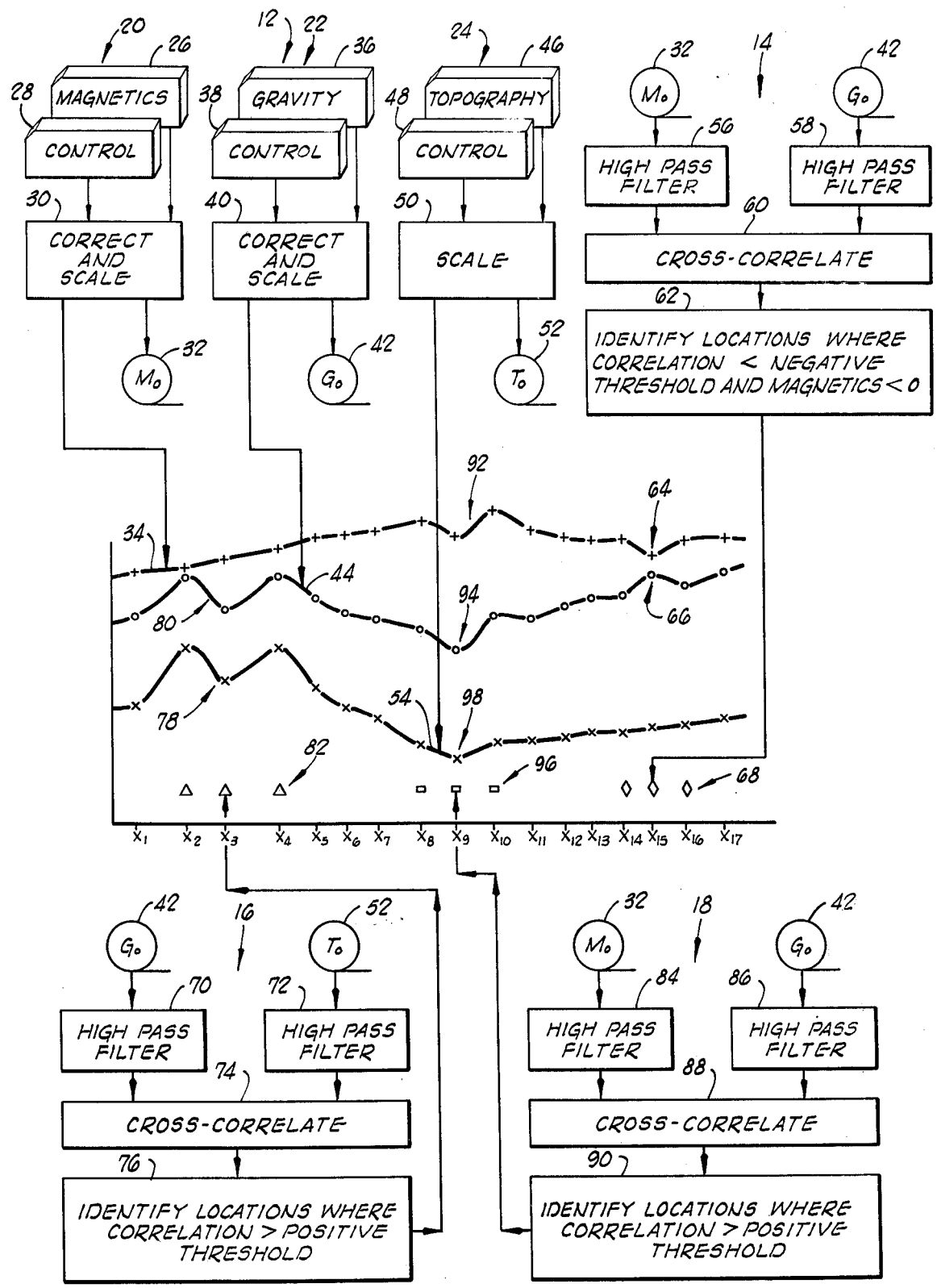

METHOD FOR DETECTING SUBSURFACE MINERAL BODIES USING GRAVITY MAGNETIC AND TOPOGRAPHIC SURVEYS

BACKGROUND OF THE INVENTION

1. Field of the Invention

This invention relates generally to a method for detecting subsurface mineral bodies and, more particularly, but not by way of limitation, to a method for determining a set of surface locations lying along a predetermined line of survey beneath which there is a relatively high probability of existing subsurface mineral bodies exhibiting relatively high density and relatively low magnetic susceptibility.

2. Description of the Prior Art

The acquisition and use of magnetic and gravitational field intensities at selected locations along predetermined line of surveys via gravimeter and magnetometer devices are well known in the geophysical arts. See, M. B. Dobrin, *Introduction to Geophysical Prospecting,* McGraw-Hill Book Company, Inc., New York, 1952; C. A. Heiland, *Geophysical Exploration,* Prentice-Hall Book Company, New York, 1946; J. J. Jakosky, Exploration Geophysics, Trija Publishing Company, Los Angeles, 1950; L. L. Nettleton, *Geophysical Prospecting for Oil,* McGraw-Hill Book Company, Inc., New York, 1940; L. L. Nettleton, "Elementary Gravity and Magnetics For Geologists and Seismologists", Society of Exploration Geophysicists, Monograph Number 1, Tulsa, Oklahoma, 1971. However, it has been generally believed in the past that subsurface mineral bodies exhibiting relatively high density and relatively low magnetic susceptibility, such as fluorite deposits in sedimentary rock regions, cannot be detected directly by analysis of the magnetic and gravitational field intensities obtained via the gravimeter and magnetometer surveys. See, e.g., Manas Veeraburas, "Fluorite Resources in Thailand", American *Association of Petroleum Geologists Bulletin,* Vol. 58, No. 7, July 1974.

SUMMARY OF THE INVENTION

An object of the present invention is to provide a method for detecting subsurface mineral bodies exhibiting relatively high density and relatively low magnetic susceptibility.

Another object of the present invention is to provide a method for detecting subsurface mineral bodies of the vein type exhibiting relatively high density and relatively low magnetic susceptiblity through utilization of magnetic and gravitational field intensity information obtained via field surveys.

Still another object of the present invention is to provide a method for detecting subsurface mineral bodies of the bed type exhibiting relatively high density and relatively low magnetic susceptibility through utilization of gravitational field intensity and surface elevation information obtained via field surveys.

Yet another object of the present invention is to provide a method for detecting near-surface fault locations along which there is a relatively high probability of existing subsurface mineral bodies exhibiting relatively high density and relatively low magnetic susceptibility through utilization of magnetic and gravitational field intensity information obtained via field survey.

Another object of the present invention is to provide an economical and relatively rapid method for determining probable locations of subsurface mineral bodies having relatively high density and relatively low magnetic susceptibility.

Other objects and advantages of the present invention will be evident from the following detailed description when read in conjunction with the accompanying drawings which illustrate various aspects of the invention.

BRIEF DESCRIPTION OF THE DRAWING

The FIGURE illustrates in diagrammatical form the method of the present invention.

DESCRIPTION OF THE PREFERRED EMBODIMENT

Within the field of geophysical prospecting, it is well known that valuable information pretaining to the characteristics of subsurface features can be obtained by measuring the variations of the earth's magnetic and gravitational fields as a function of surface location. As a consequence, various well known apparatus have been developed which are capable of determining with a high degree of accuracy the relatively low magnitude variation in the earth's magnetic and gravitational fields resulting from differences in subsurface structure underlying different surface locations. For example, the vertical component of the magnetic field intensity may be measured using the Askania Model GSZ Magnetometer or the total magnetic field intensity may be measured using the geoMetrics Model G-816 Magnetometer, while the gravitational field intensity may be measured using the Worden Prospector or Master model gravity meter or the LaCoste Romberg Model G gravity meter. In general, such apparatus is utilized to determine the relative magnetic field intensity and relative gravitational field intensity at each of a plurality of predetermined surface locations selected along a predetermined line of survey. The method of the present invention may then be utilized to determine a master set of the predetermined surface locations beneath which there is a relatively high probability of existing subsurface mineral bodies having relatively high density and relatively low magnetic susceptibility. For example, the method of the present invention may be used advantageously to detect near surface fluorspar deposits in a sedimentary rock structure when the density of the fluorspar deposit is greater than that of the surrounding sedimentary rocks and the magnetic susceptibility of the fluorspar deposit is less than the magnetic susceptibility of the surrounding sedimentary rocks.

Referring now to the drawing, shown therein is a diagrammatical representation of the preferred embodiment of the present invention as it could be practiced using either analog or digital automatic data processing equipment or the like. If desired, the present invention may be practiced by a skilled geophysicist by allowing the automatic data processing to perform only those functions for which it is best adapted, such as the operations comprising the data preparation phase 12, with the geophysicst performing the specific indentification function. For convenience of reference hereinafter, the preferred embodiment of the method of the present invention as shown in the FIGURE can be considered as consisting of a data preparation phase 12, a vein detection phase 14, a bed detection phase 16, and a fault detection phase 18. The data preparation phase 12, can be further subdivided into a magnetics preparation phase 20, a gravity preparation phase 22 and a topographical preparation phase 24.

In the magnetics preparation phase 20, a raw magnetics data file 26 is constructed in a conventional manner by recording the magnetic field intensity measured at each of the predetermined surface locations on a medium acceptable to the automatic data processing equipment, such as punched cards. However, it is well known that the raw magnetic field intensities contain components attributable to physical phenomena other than near surface structure. In general, it is preferable to remove these undesired components. To this end, a magnetics control information file 28 is constructed in a manner similar to the magnetics data file, with the control information file containing such information as the diurnal variations of the earth's magnetic field during the period that the raw magnetic field intensities were obtained, the ambient temperature at each predetermined surface location at the time the associated magnetic field intensity was obtained, and the normal correction factor attributable to the normal variation of magnetic intensity over the earth's surface, each of these factors being well known in the art.

The magnetics data file 26 and the magnetics control information file 28 are thereafter utilized by the automatic data processing equipment in a magnetics correction process 30 under the control of an appropriate program constructed to operate in a conventional, well known manner. Preferably, the automatic data processing equipment will also be programmed to adjust the amplitude scale of the magnetic field intensities to a preselected range or scale. After correction, the magnetic field intensities 32 should then be made available for use in subsequent phases by being recorded on a suitable medium such as magnetic tape. If desired, a two dimensional representation of the corrected magnetic field intensities, such as the magnetic plot 34, may be constructed utilizing conventional plotting equipment.

In the gravity preparation phase 22, a raw gravity data file 36 is constructed in a conventional manner by recording the gravitational field intensity measured at each of the predetermined surface locations on a medium acceptable to the automatic data processing equipment. As is well known in the art, the raw gravitational field intensities contain components attributable to physical phenomena other than near surface structure. In general, it is preferable to remove these undesired components. To this end, a gravity control information file 38 is constructed in a manner similar to the magnetics control information file 28, except that the gravity control information file 38 contains such information as the latitude and relative surface elevation at each predetermined surface location, the latter factor being multiplied in a well known manner by a regional elevation correction having a free air correction factor to compensate for the vertical decrease of gravity with an increase in elevation and a Bouguer correction factor to compensate for the attraction of material between a predetermined reference elevation and the particular surface location, each of these factors being well known in the art.

The gravity data file 36 and the gravity control information file 38 are thereafter utilized by the automatic data processing equipment in a gravity correction process 40 under the control of an appropriate program constructed to operate in a conventional, well known manner. Preferably, the automatic data processing equipment will also be programmed to adjust the amplitude scale of the gravitational field intensities to a preselected range or scale. After correction, the gravitational field intensities 42 should then be made available for use in subsequent phases by being recorded on a suitable medium, such as magnetic tape. If desired, a two dimensional representation of the corrected gravitational field intensities, such as the gravity plot 44, may be constructed utilizing conventional plotting equipment.

In the topographic preparation phase 24, a raw topographic data file 46 is constructed in a conventional manner by recording the surface elevation at each of the predetermined surface locations on a medium acceptable to the automatic data processing equipment. Although the raw surface elevation information is generally of sufficient accuracy, it is preferable that the amplitude scale of the surface elevations be limited to a preselected range or scale. To this end, a topographic control information file 48 is constructed in a manner similar to the magnetics control information file 28, except that the topographic control information file 48 contains information relating to the preselected range or scale.

The topographic data file 46 and the topographic control information file 48 are thereafter utilized by the automatic data processing equipment in a topographic scaling process 50 under the control of an appropriate program constructed to operate in a conventional, well known manner to adjust the amplitude scale of the surface elevations to the preselected range or scale. After scaling, the surface elevations 52 should then be made available for use in subsequent phases by being recorded on a suitable medium, such as magnetic tape. If desired, a two dimensional representation of the scaled surface elevations, such as the topographic plot 54, may be constructed utilizing conventional plotting equipment.

In the vein detection phase 14, the magnetic field intensities 32 and the gravitational field intensities 42 are utilized to select for membership in the master set a first subset of surface locations at which a local minimum of the magnetic field intensities 32 substantially directly correlates to a local maximum of the gravitational field intensities 42. More particularly, the magnetic field intensities 32 and the gravitational field intensities 42 are utilized by the automatic data processing equipment in respective high pass filter processes 56 and 58 under the control of appropriate programs constructed to emphasize those variations in magnetic and gravitational field intensity attributable to near surface anomalies of rather narrow extent. Such filtering operations may be performed utilizing such conventional techniques as time or frequency domain filtering, least squares polynomial approximations or moving averages. Since programs designed to perform such filter operations are well known in the art, no further discussion will be made herein relative thereto. See, N. A. Anstey, "Correlation Techniques-A Review", *Journal of the Canadian Society of Exploration Geophysicists*, Vol. 2, No. 1 (December, 1966); B. P. Dash and B. L. A. Hains, "Moveout Detection By An Autocorrelation Matrix Method", *Geophysics*, Vol. 39, No. 6 (December, 1974); R. O. Lindseth, "The Nature of Digital Seismic Processing", *Journal of the Canadian Society of Exploration Geophysicists*, Vol. 3, No. 1 (December, 1967); and E. Robinson, *Multichannel Time Series With Digital Computer Progams*, Holden-Day, Inc., San Francisco, 1967.

The filtered magnetic field intensities and the filtered gravitational field intensities are then utilized by the automatic data processing equipment in a first crosscorrelation phase 60 under the control of an appropriate program constructed to correlate the set consisting of the filtered magnetic field intensities with the set consisting of the filtered gravitational field intensities to produce a set consisting of the first correlation value for each of the predetermined surface locations. Since programs designed to perform such a correlation operation are well known in the art, no further discussion will be made herein relative thereto. See above references.

The automatic data processing equipment may then utilize the set of first correlation values in a first identification phase 62 to identify for membership in the first subset those surface locations where the first correlation value is less than a predetermined negative threshold indicating that a local anomaly of the magnetic field intensities (one such anomaly being indicated by reference number 64) negatively correlates with a local anomaly of the gravitational field intensities (one such anomaly being indicated by the reference number 66). In order to eliminate from consideration those surface locations at which a local maximum of the magnetic field intensities negatively correlates with a local minimum of the gravitational field intensities, the automatic data processing equipment should further identify those surface locations where the first correlation value was determined to be less than the predetermined negative threshold and where the filtered magnetic field intensities are less than zero indicating a local minimum thereof. This first subset of surface locations may then be identified as the two-dimensional representation in an appropriate manner, if desired, such as the diamond-shaped marks 68. In the bed detection phase 16, the gravitational field intensities 42 and the surface elevations 52 are utilized to select for membership in the master set a second subset of surface locations consisting of those surface locations lying within each region of local topographic irregularity wherein the gravitational field intensity substantially directly correlates with the surface elevation, indicating a subsurface density greater than expected. More particularly, the gravitational field intensities 42 and the surface elevations 52 are utilized by the automatic data processing equipment in respective high pass filter processes 70 and 72 under the control of appropriate programs constructed to emphasize those variations in gravitational field intensity attributable to near surface anomalies of rather narrow extent and local topographic irregularities, respectively. Since programs designed to perform such filter operations are well known in the art, no further discussion will be made herein relative thereto.

The filtered gravitational field intensities and the filtered surface elevations are then utilized by the automatic data processing equipment in a second cross-correlation phase 74 under the control of an appropriate program constructed to correlate the set consisting of the filtered gravitational field intensities with a set consisting of the filtered surface elevations to produce a set consisting of the second correlation value for each of the predetermined surface locations. Since programs designed to perform such a correlation operation are well known in the art, no further discussion will be made herein relative thereto.

The automatic data processing equipment may then utilize the set of second correlation values in a second identification phase 76 to identify for membership in the second subset those surface locations at which the second correlation value exceeds a predetermined positive threshold, indicating that a local topographic irregularity (one such irregularity being indicated by reference number 78) positively correlates with the local anomaly of the gravity field intensities (one such anomaly being indicated by reference number 80). This second subset of surface locations may then be identified on the two-dimensional representation in an appropriate manner, if desired, such as the triangle-shaped marks 82.

In the fault detection phase 18, the magnetic field intensities 32 and the gravitational field intensities 42 are utilized to select for membership in the master set a third subset of surface locations consisting of those surface locations lying within each region wherein a steep gradient between a local maximum and an adjacent local minimum of the magnetic field intensities substantially directly correlates with a steep gradient between a local maximum and an adjacent local minimum of the gravitational field intensities. More particularly, the magnetic field intensities 32 and the gravitational field intensites 42 are utilized by the automatic data processing equipment in respective high pass filter processes 84 and 86 under the control of appropriate programs constructed to emphasize those variations in magnetic and gravitational field intensity attributable to near surface anomalies of rather narrow extent. Since programs designed to perform such filter operations are well known in the art, no further discussion will be made herein relative thereto.

The filtered magnetic field intensities and the filtered gravitational field intensities are then utilized by the automatic data processing equipment in a third cross-correlation phase 88 under the control of an appropriate program constructed to correlate the set consisting of the filtered magnetic field intensities with the set consisting of the filtered gravitational field intensities to produce a set consisting of the third correlation value for each of the predetermined surface locations. Since programs designed to perform such a correlation operation are well known in the art, no further discussion will be made relative thereto.

The automatic data processing equipment may then utilize the set of third correlation values in a third identification phase 90 to identify for membership in the third subset those surface locations where the third correlation value exceeds a second positive threshold, indicating that a local anomaly of the magnetic field intensities (one such anomaly being indicated by the reference number 92) positively correlates with a local anomaly of the gravitational field intensities (one such anomaly being indicated by the reference number 94). This third subset of surface locations may then be identified on the two-dimensional representation in an appropriate manner, if desired, such as the rectangle-shaped marks 96. In general, the ability of the fault detection phase to detect actual subsurface faulting may be improved by correlating the set of surface elevations with the set of magnetic or gravitational field intensities to detect local topographic anomalies (one such anomaly being indicated by the reference number 98) which correlates with the identified magnetic and gravitational anomalies.

Changes may be made in the steps or the order of the steps as disclosed herein without departing from the spirit and scope of the invention as defined in the following claims.

What is claimed is:

1. A method for determining a set of surface locations lying along a predetermined line of survey beneath which there is a relatively high probability of existing subsurface mineral bodies having relatively high density and relatively low magnetic susceptibility, the method comprising the steps of:

determining the relative magnetic field intensity and relative gravitational field intensity at each of a plurality of predetermined surface locations selected along the predetermined line of survey; and, selecting for membership in said set a first subset of surface locations at which a local minimum of the magnetic field intensities substantially directly correlates to a local maximum of the gravitational field intensities, wherein the step of selecting the first subset is further defined as comprising the steps of:

filtering the set consisting of the magnetic field intensity at each of the predetermined surface locations;

filtering the set consisting of the gravitional field intensity at each of the predetermined surface locations;

correlating the set consisting of the filtered magnetic field intensities with the set consisting of the filtered gravitional field intensities to produce a set consisting of the first correlation value for each of the predetermined surface locations; and, identifing for membership in said first subset those surface locations at each of which the first correlation value is less than a predetermined negative threshold and the filtered magnetic field intensity is greater than zero.

2. A method for determining a set of surface locations lying along a predetermined line of survey beneath which there is a relatively high probability of existing subsurface mineral bodies having relatively high density and relatively low magnetic susceptibility, the method comprising the steps of:

determining the relative magnetic field intensity and relative gravitational field intensity at each of a plurality of predetermined surface locations selected along the predetermined line of survey;

determining the surface elevation at each of the predetermined surface locations;

selecting for membership in said set a first subset of surface locations at which a local minimum of the magnetic field intensities substantially directly correlates to a local maximum of the gravitational field intensities; and, selecting for membership in said set a second subset of surface locations consisting of those surface locations lying within each region of local topographic irregularity wherein the gravational field intensity substantially directly correlates with the surface elevation, wherein the step of selecting the second subset is further defined as comprising the steps of:

filtering the set consisting of the gravitional field intensity at each of the predetermined surface locations;

filtering the set consisting of the surface elevation at each of the predetermined surface locations;

correlating the set consisting of the filtered gravitional field intensities with the set consisting of the filtered surface elevations to produce a set consisting of the second correlation value for each of the predetermined surface locations; and, identifying for membership in said second subset those surface locations at which the second correlation value exceeds a predetermined positive threshold.

3. A method for determining a set of surface locations lying along a predetermined line of survey beneath which there is a relatively high probability of existing subsurface mineral bodies having relatively high density and relatively low magnetic susceptibility, the method comprising the steps of:

determining the relative magnetic field intensity and relative gravitional field intensity at each of a plurality of predetermined surface locations selected along the predetermined line of survey;

determining the surface elevation at each of the predetermined surface locations;

selecting for membership in said set a first subset of surface locations at which a local minimum of the magnetic field intensities substantially directly correlates to a local maximum of the gravitional field intensities;

selecting for membership in said set a second subset of surface locations consisting of those surface locations lying within each region of local topographic irregularity wherein the gravitional field intensity substantially directly correlates with the surface elevation; and, selecting for membership in said set a third subset of surface locations consisting of those surface locations lying within each region wherein a steep gradient between a local maximum and an adjacent local minimum of the magnetic field intensities substantially directly correlates with a steep gradient between a local maximum and an adjacent local minimum of the gravitational field intensities, wherein the step of selecting the third subset is further defined as comprising the steps of:

filtering the set consisting of the magnetic field intensity at each of the predetermined surface locations;

filtering the set consisting of the gravitational field intensity at each of the predetermined surface locations;

correlating the set consisting of the filtered magnetic field intensities with the set consisting of the filtered gravitational field intensities to produce a set consisting of the third correlation value for each of the predetermined surface locations; and, identifying for membership in said third subset those surface locations at which the third correlation value exceeds a second positive threshold.

4. A method for determining a set of surface locations lying along a predetermined line of survey beneath which there is a relatively high probability of existing subsurface mineral bodies having relatively high density and relatively low magnetic susceptability, the method comprising the steps of:

determining the relative magnetic field intensity and relative gravitational field intensity at each of a plurality of predetermined surface locations selected along the predetermined line of survey;

selecting for membership in said set a first subset of surface locations at which a local minimum of the magnetic field intensities substantially directly correlates to a local maximum of the gravitational field intensities; and, selecting for membership in said set a third subset of surface locations consisting of those surface locations lying within each region wherein a steep gradient between a local maximum and an adjacent local minimum of the magnetic field intensities substantially directly correlates with a steep gradient between a local maximum and an adjacent local minimum of the gravitational field intensities, wherein the step of selecting the third subset is further defined as comprising the steps of:

filtering the set consisting of the magnetic field intensity at each of the predetermined surface locations;

filtering the set consisting of the gravitational field intensity at each of the predetermined surface locations;

correlating the set consisting of the filtered magnetic field intensities with the set consisting of the filtered gravitational field intensities to produce a set consisting of the third correlation value for each of the predetermined surface locations; and, identifying for membership in said third subset those surface locations at which the third correlation value exceeds a second positive threshold.

* * * * *